United States Patent [19]

Vinko

[11] Patent Number: 4,702,081

[45] Date of Patent: Oct. 27, 1987

[54] COMBINED STEAM AND GAS TURBINE PLANT

[75] Inventor: Mučić Vinko, Walldorf, Fed. Rep. of Germany

[73] Assignee: TCH Thermo-Consulting-Heidelberg GmbH, Heidelberg, Fed. Rep. of Germany

[21] Appl. No.: 930,261

[22] PCT Filed: Mar. 3, 1986

[86] PCT No.: PCT/EP86/00/07

§ 371 Date: Nov. 14, 1986

§ 102(e) Date: Nov. 14, 1986

[87] PCT Pub. No.: WO86/05234

PCT Pub. Date: Sep. 12, 1986

[30] Foreign Application Priority Data

Mar. 15, 1985 [DE] Fed. Rep. of Germany ....... 3509357

[51] Int. Cl.[4] ............................................ F01K 23/02
[52] U.S. Cl. .................................................... 60/655
[58] Field of Search .......................................... 60/655

[56] References Cited

U.S. PATENT DOCUMENTS 4,041,709 8/1977 Rajakovics ............................ 60/655
4,428,190 1/1984 Bronicki ................................ 60/655

Primary Examiner—Allen M. Ostrager

[57] ABSTRACT

The plant has a steam generator connected to a multi-part steam turbine which drives an electrical generator and has intermediate superheaters between the turbine parts. It is driven by steam supplied at supercritical pressure by the steam generator. A second electrical generator is driven by a multi-part gas turbine with multiple expansion and intermediate heating of the turbine gases. The heated turbine gases issuing from the gas turbine are fed to heating surfaces in the steam generator and to a preheater, connected to the latter, for the condensate flowing in the steam circuit back to the steam boiler. The turbine gas heaters integrated with the intermediate superheaters in the steam circuit are formed in a boiler fired with fossil fuels.

3 Claims, 1 Drawing Figure

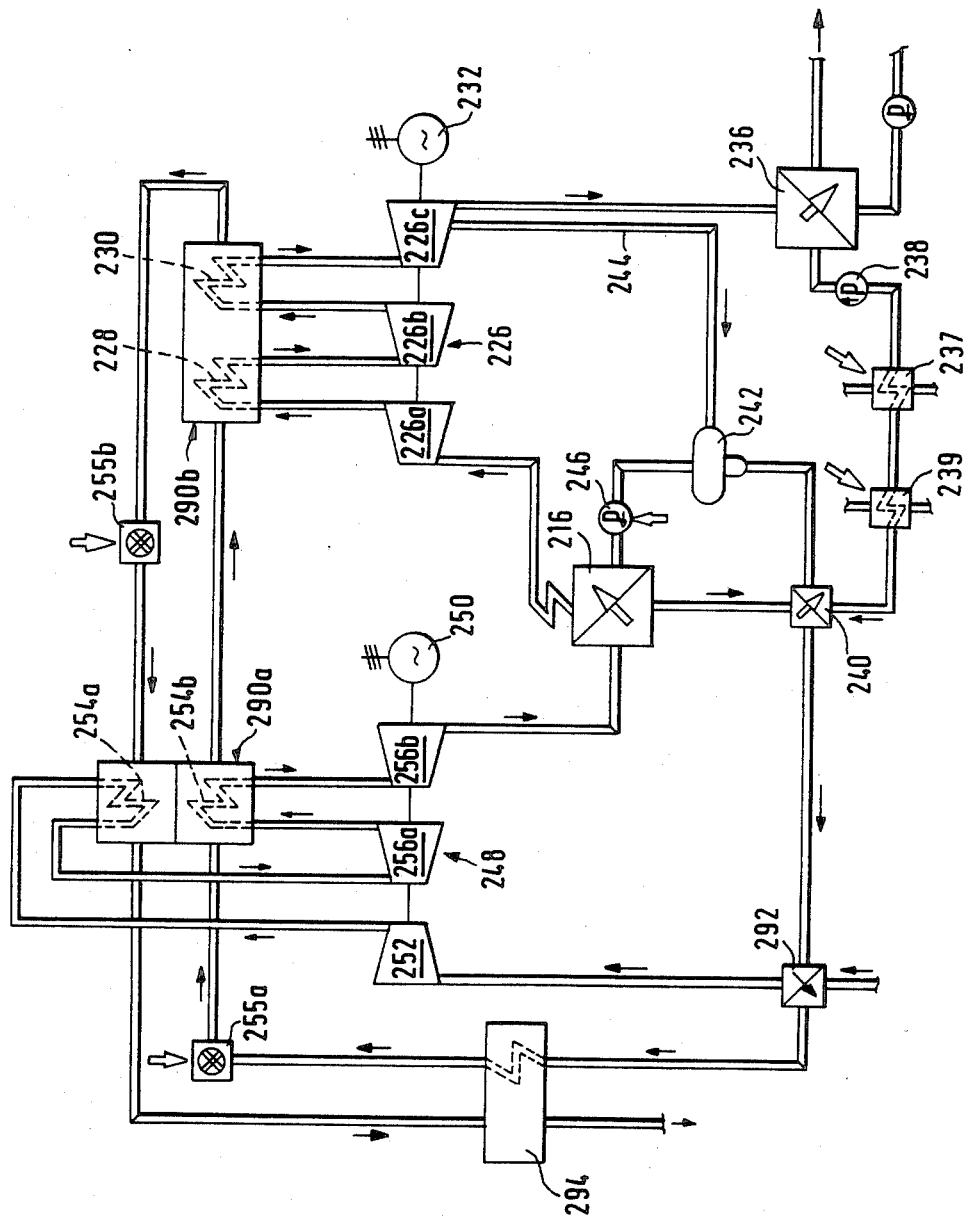

COMBINED STEAM AND GAS TURBINE PLANT

The invention relates to a combined steam and gas turbine plant for the production of electrical energy, having a steam generator which is followed in a circuit by a steam turbine driving an electrical generator, from which the steam, after liquefaction in a condenser, is returned to the steam generator as feed water by means of a condensate pump through at least one preheating stage, and having a gas turbine driving a second electrical generator, which is driven by a turbine gas, preferably nitrogen or helium running in the closed circuit, and whose outlet for the heated turbine gases is connected by a conduit to heating surfaces in the steam generator and to the heat exchanger forming the preheating stage following the heating surfaces, which is inserted into the branch of the circuit that returns the condensate to the steam generator, the steam generator in combination with the gas turbine being so constructed that the evaporation of the feed water takes place at supercritical pressure, and the steam turbine is divided into at least two turbine parts and an intermediate superheating stage is inserted between each pair of successive turbine parts.

Whereas in plain steam engines today net efficiencies of up to about 40% are achieved, in the combined steam and gas turbine power plants constructed and planned to date, wherein a single gas turbine process is followed by a steam process with a single intermediate superheating of the steam, this efficiency is increased to about 45%.

In a known plant of the kind mentioned above (DE-OS No. 26 56 463), in which the thermal energy is obtained from the heat produced by the fission of nuclear fuels in a high-temperature reactor, the thermal energy is removed by a gaseous coolant, e.g. helium, which circulates in a closed circuit. This cooling circuit is simultaneously the closed gas turbine circuit, so that the reactor coolant is simultaneously the turbine gas.

It is the object of the invention, on the other hand, to create a combined steam and gas turbine plant, powered by firing with conventional fossil fuels, whose efficiency will be further optimized in comparison with the known, conventionally fired plants, while the production of combustion exhaust gases will be minimized.

Setting out from a plant of the kind mentioned in the beginning, this object is achieved according to the invention by constructing the gas turbine as a multi-part turbine with multiple expansion and intermediate heating of the turbine gases, by making the heating surfaces of a coal-fired boiler to be the heaters for the turbine gases as well as the intermediate superheaters in the steam circuit, and by providing the coal-fired boiler with two separate firing chambers in tandem having separate heating surfaces, associated one with the heaters and one with the intermediate heaters of the gas turbines.

The heating surfaces of the intermediate superheaters of the steam turbines are preferably connected to the output from the heating surfaces forming the intermediate heater of the gas turbine, and associated with the first firing chamber of the boiler.

To attain the desired reduction of the combustion exhaust gases and to improve efficiency, it is furthermore recommendable to connect to the output of the turbine gases from the turbine a heat exchanger through the other side of which at least a portion of the air being fed to the boiler as combustion air passes and is preheated.

The invention will be further explained in the description of an embodiment that follows, in conjunction with the drawing which is a circuit diagram of a combined steam and gas turbine plant powered by a coal-fired boiler having two firing chambers in tandem.

The combined steam and gas turbine plant shown in the drawing is divided into a steam power plant part represented on the right in the drawing, which has a three-phase electrical generator driven by a steam turbine 226, and a gas turbine plant part represented on the left in the drawing, which has a second three-phase electrical generator driven by a gas turbine 248.

The thermal energy is produced in a boiler 290a, 290b, which in the present case may be coal-fired, and which has two separate firing chambers 255a, 255b, in tandem. The combustion air of the boiler is preheated in a regenerative heat exchanger 294 in which thermal energy still contained in the combustion exhaust gases issuing from the boiler is transferred to the combustion air.

The gas turbine part of the plant operates with a turbine gas, e.g., nitrogen or helium, circulating in a closed circuit, the gas turbine 248 pumping the turbine gas aspirated by means of its compressor 252 to a heater 254a which is formed by heating surfaces of the boiler which are associated with the fire chamber 255b. The heated turbine gases then enter the first turbine part 256a of the gas turbine and there they perform work, thus losing temperature and pressure. After emerging from the turbine part 256a they are heated again in an intermediate heater 254b associated with the fire chamber 255a and they are fed to the turbine part 256b from which, after performing work, they then flow to a heat exchanger 216; after emerging from the latter they flow to a heat exchanger 240, and lastly they flow back through an additional heat exchanger 292 to the compressor 252.

The steam turbine part of the plant has the steam turbine 226, which in the present case is divided into three turbine parts 226a, 226b and 226c, to whose first turbine part 226c steam is delivered, which has been heated by transfer of heat from the turbine gases in the heat exchanger 216. After emerging from the turbine part 226a, the steam is heated in an intermediate superheater 228 and fed to the turbine part 226b and, after performing work in this turbine part, it is again heated in an intermediate superheater 230 and then fed to the final turbine part 226c. The intermediate superheaters 228 and 230 are formed by the heating surfaces associated with the fire chamber 255a of the boiler.

The steam coming from the final turbine stage 226c is fed into a condenser 236, which can be cooled for example by river water, and thus the incoming steam is condensed. The condensate is fed by a condensate pump 238 through a heat exchanger 237 and an additional heat exchanger 239 to a heat exchanger 240. In the heat exchanger 238 the waste heat obtained by cooling the generators and by the oil cooling of the sets is transferred to the condensate, so that its temperature may already be slightly higher. In the heat exchanger 240, the condensate is then further heated by the transfer of heat from the turbine gases, and forwarded to a degassing system 242 in which the condensate is treated by the input through a conduit 244 of steam tapped from the last turbine part 226c, thus driving out residual gases. The condensate thus further heated is then fed by an additional pump 246 into the heat exchanger 216 where the steam generation is performed by the transfer of heat from the turbine gases.

It is also pointed out that not only is the boiler combustion air preheated by the transfer of heat from the combustion exhaust gases in the regenerative heat exchanger 294, but also it is preheated before that in the above-mentioned heat exchanger 292, in which any thermal energy still contained in the turbine gases after emerging from the heat exchanger 240 is transferred to the combustion air.

It will be understood that modifications and developments of the embodiment described can be made within the scope of the idea of the invention. Thus, instead of coal firing, the firing can be performed with a different fossil fuel.

What is claimed:

1. Combined steam and gas turbine plant for the production of electrical energy, having a steam generator which is followed in a circuit by a steam turbine driving an electrical generator, from which the steam, after liquefaction in a condenser, is returned to the steam generator as feed water by means of a condensate pump through at least one preheating stage, and having a gas turbine driving a second electrical generator, which is driven by a turbine gas, preferably nitrogen or helium running in the closed circuit, and whose outlet for the heated turbine gases is connected by a conduit to heating surfaces in the steam generator and to the heat exchanger forming the preheating stage following the heating surfaces, which is inserted into the branch of the circuit that returns the condensate to the steam generator, the steam generator in combination with the gas turbine being so constructed that the evaporation of the feed water takes place at supercritical pressure, and the steam turbine is divided into at least two turbine parts and an intermediate superheating stage is inserted between each pair of successive turbine parts, characterized in that the gas turbine (248) is constructed as a multi-part turbine (256a; 256b) with multiple expansion and intermediate heating of the turbine gases, that the heaters (254a; 254b) for the turbine gases are formed, like the intermediate superheaters (230; 228) in the steam circuit, by heating surfaces of a coal-fired boiler (290), and that the coal-fired boiler (290a; 290b) has two separate fire chambers (255a; 255b) in tandem having separate hearing surfaces associated one with the heaters (254a) and one with the intermediate heaters (254b) of the gas turbine (248).

2. Steam and gas turbine plant according to claim 1, characterized in that the heating surfaces for the intermediate superheaters (228; 230) of the steam turbine are connected to the heating surfaces forming the intermediate heater (254b) of the gas turbine (248), are associated with the first fire chamber (255a) of the boiler (290a; 290b).

3. Steam and gas turbine plant according to claim 1 or 2, characterized in that a heat exchanger (290) is connected to the output of the turbine gases from the gas turbine (248), through which at least a part of the air to be fed to the boiler (290a; 290b) as combustion air flows and is heated.

* * * * *